Aug. 9, 1960

R. M. PAGE 2,948,893

AUTOMATIC RANGE INDICATING SYSTEM

Filed April 6, 1943

Inventor
ROBERT M. PAGE

By

Attorney

Aug. 9, 1960
R. M. PAGE
2,948,893
AUTOMATIC RANGE INDICATING SYSTEM
Filed April 6, 1943
3 Sheets-Sheet 2
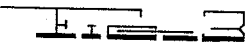
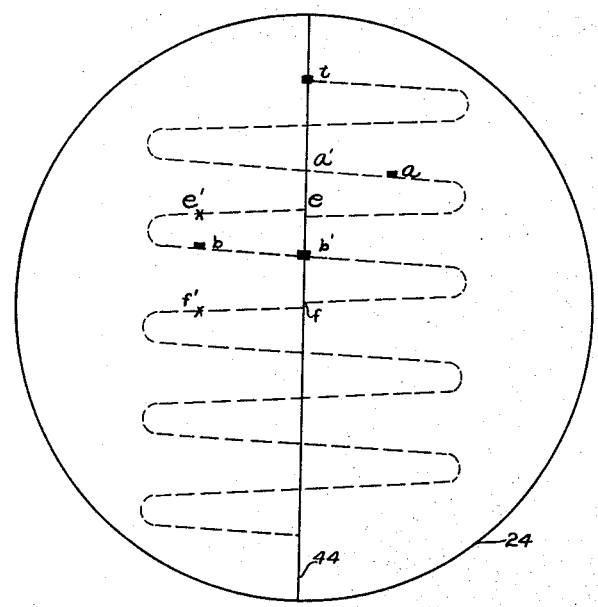
Inventor
ROBERT M. PAGE
By
Attorney

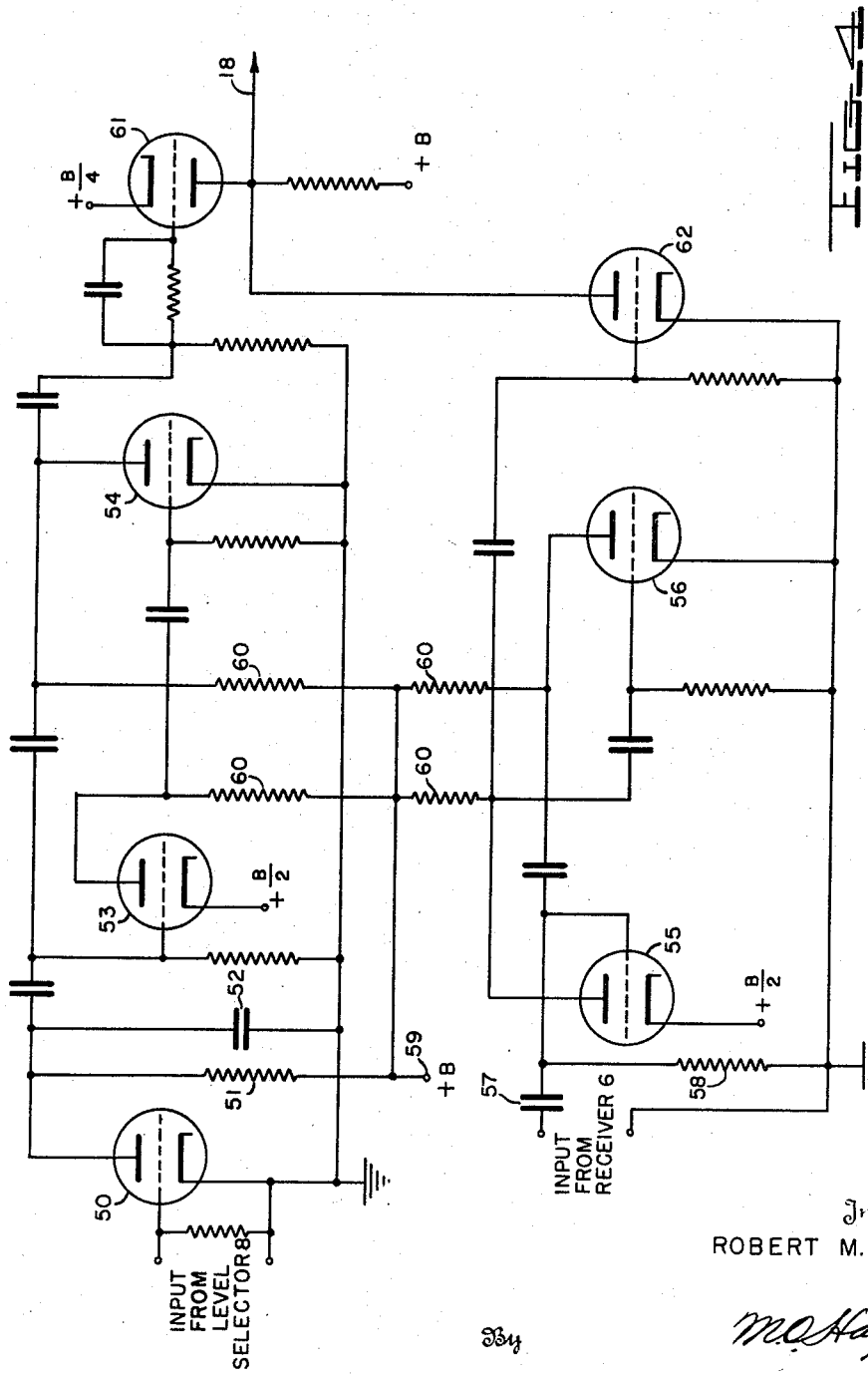

2,948,893
Patented Aug. 9, 1960

2,948,893

AUTOMATIC RANGE INDICATING SYSTEM

Robert M. Page, Washington, D.C., assignor, by mesne assignments, of eight percent to John Robert Page, sixteen percent to Grace Gowens Leaf, as trustee, twelve and five-sixths percent to La Verne R. Philpott, and thirty-seven and one-half percent to Leo C. Young Filed Apr. 6, 1943, Ser. No. 481,970

19 Claims. (Cl. 343—7.3)

(Granted under Title 35, U.S. Code (1952), sec. 266)

This invention relates to radio echo apparatus and more particularly to a means of and method for indicating the range of remote objects with a high degree of accuracy, and moreover provides a means for automatically indicating the change in range of remote moving objects.

Radio echo apparatus provided by the prior art included a means for producing and transmitting a series of equally spaced energy pulses, a means for producing a timing scale in synchronism with the transmitted series and a means responsive to reception of energy reflected from remote objects being impinged upon by the transmitted pulses. The latter means operates to produce an indication on the timing scale of the range of the remote object from which the energy is reflected. More particularly the means employed to produce the timing scale usually comprises a cathode ray oscillograph incorporated with a means for initiating the sweep of the electron beam thereof, in coincidence with the transmission of an energy pulse.

A system of the foregoing character provides adequate results insofar as a continual indication of the presence of remote objects or approximate range thereof is concerned, but is extremely inadequate for accurate range measurements. For example, let it be assumed, for all practical purposes, that an oscillograph having a six inch time sweep is employed to measure ranges extending to sixty thousand yards or ten thousand yards per inch in time sweep. Obviously this case, which is practical in all respects, contains an extremely low reading accuracy and therefore would not suffice for the accurate range measurements required for such purposes as gunfire control.

It is, therefore, an object of this invention to provide a novel means of indicating the range of remote objects with a high degree of accuracy.

Another object is to provide a novel means for automatically indicating the changing range of a moving object.

Another object is to provide a means for indicating the range of a remote object as a function of time phase of a selected timing wave. It is another object of this invention to provide a radio echo apparatus having an oscillograph and a time sweep of the electron beam thereof with a means for automatically maintaining indications of energy reflections on a reference line by automatically varying the time phase between the initiation of said sweep and the transmission of an energy pulse in response to the change in range of a moving object producing said energy reflection.

Other objects and features of the present invention will appear more fully hereinafter from the following detailed description when taken together with the accompanying drawings. The figures of the drawings are designed for the purpose of illustration only and should not be taken as a definition of the limits of the invention, reference to the latter purpose being had to the appended claims.

Fig. 3 is a face view of the oscillograph 13 incorporated in the circuit of Fig. 1 and showing a typical operating condition of the present invention, and Fig. 4 is a schematic diagram of the coincidence metering circuit 17 shown in Figure 1.

Figure 1:
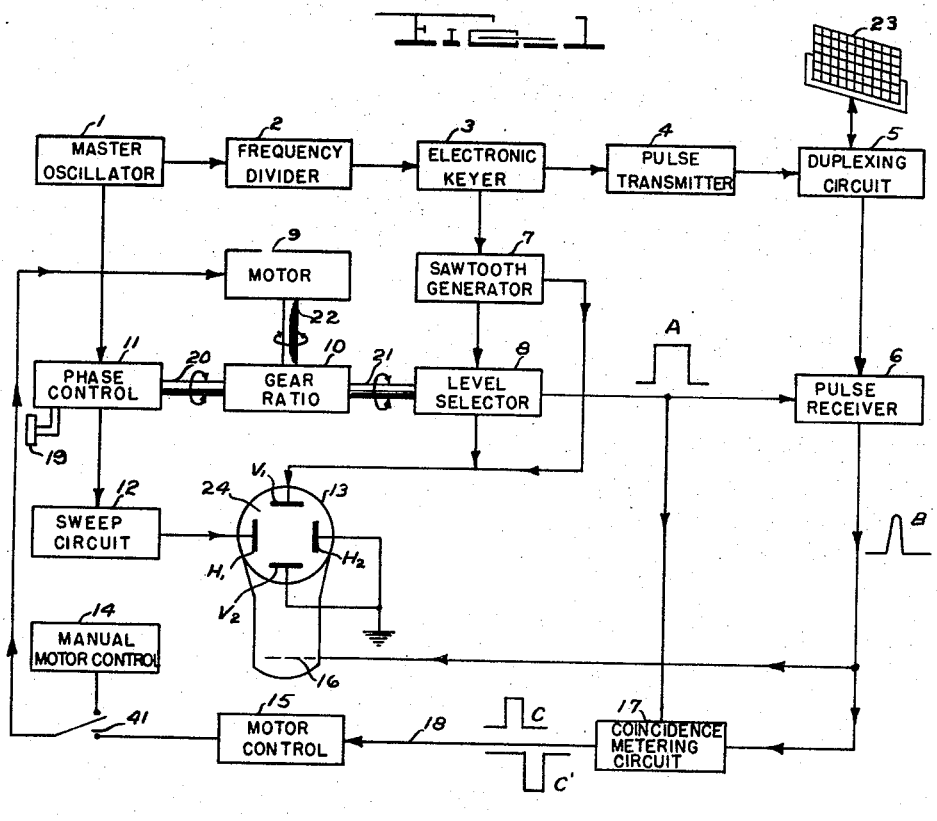
Fig. 1 is a schematic block diagram of the invention, including miniature oscillograms drawn in at various points along the circuit and representing typical output voltages from the elements to which they refer.

More particularly with reference to Fig. 1, an apparatus constructed in accordance with the principles of the present invention is shown therein including pulse transmitter 4, which is connected to the master oscillator 1 through electronic keyer 3 and frequency divider 2. The frequency divider 2 is of any conventional design and provides any desired frequency division factor such as, for instance, five to one. Thus pulse transmitter 4 contains a repetition rate in accordance with the divided frequency output of master oscillator 1.

The output of pulse transmitter 4 is connected to the directional antenna 23 by way of the duplexing device 5 which is now well known to the art and makes possible energy transmission and reception on a single antenna. Pulse receiver 6 which is also coupled to a channel of the duplexing circuit 5 is connected to the intensity grid 16 of the oscillograph 13 for modulating the intensity of the electron beam thereof in response to reception of an energy reflection. The sweep circuit 12 is also connected to the master oscillator 1 through the phase control device 11, the purpose of which will appear more fully hereinafter. The output of the sweep circuit 12 is tied to the horizontal deflecting plate $H_1$ of the oscillograph 13, while the vertical deflecting plate $V_1$ is connected to the saw-tooth generator 7 which is keyed in synchronism with the pulse transmitter 4 by keyer 3. Thus from the apparent connections of the saw-tooth generator 7 to the master oscillator 1 and the sweep circuit 12 to the master oscillator 1 the resultant sweep of the electron beam will contain a horizontal velocity equal to the product of the vertical sweep times the division factor of the frequency divider 2. Consequently if sweep circuit 12 is feeding a sine wave to the horizontal deflecting plate $H_1$ and the frequency divider 2 contains a five-to-one division factor the oscillograph 13 will contain five complete sweep cycles as shown in Fig. 3. Thus radio echo apparatus incorporating a sweep system of the foregoing character will contain a greater range measuring accuracy than heretofore obtainable. This can be more readily comprehended by a simple comparison of the ratios of range to a corresponding unit of time sweep of the prior art with that of the present system. As previously assumed, a six inch sweep was used to embrace a range of 60,000 yards. Thus the ratio involved here is recited as 10,000 yards per inch time sweep, while the particular sweep chosen for the present system utilized five complete cycles to embrace the same range; viz., 60,000 yards or 12,000 yards per cycle. There exists, however, in each cycle of sweep two complete six inch sweeps or a total of 12,000 yards per twelve inches of sweep. Thus the ratio involved in the present system equals 1,000 yards per inch of sweep. Obviously, the present system reduces the range to sweep length ratio of the prior art by ten-to-one and is readily capable of reducing the ratio to any further degree depending upon the division factor of divider 2. It must be remembered, however, that this invention is not to be restricted to the use of the type of sweep as shown in Fig. 3, since other sweep configuration will produce the same result without departing from the spirit of the invention.

It is also contemplated by the present invention to provide a means whereby range measurements can be made with still higher degrees of accuracy. This embodiment includes the phase control device 11 which is of any suitable conventional design, such as, for instance, a goniometer. With reference more particularly to Fig. 1, the phase control device 11 is shown inserted between the master oscillator 1 and the sweep circuit 12 to control the phase relation between the input voltages to the sweep circuit 12 and the pulse transmitter 4. The arrangement is such that the sweep of the electron beam of the oscillograph 13 initiates at the same instant an energy pulse is produced at the transmitter 4. This embodiment can be more readily comprehended by first assuming that the phase control device is set at zero by the graduated dial 19, i.e., when the input voltage to the sweep circuit 12 and the pulse transmitter 4 are in phase. Thus, simultaneously with the initiation of the sweep of the electron beam a pulse is emitted from the antenna 23 as a highly directive energy beam and thereby produces a time indication $t$ on the sweep as shown in Fig. 3 and coinciding with reference line 44. This reference line 44 is preferably centered on the oscillagraph 13 and may be engraved on the face 24 of the oscillograph or produced electrically by means of deflecting the electron beam. Upon striking a reflecting object the transmitted energy wave is reflected back to the antenna 23 and passed through a channel of the duplexing circuit 5 into the receiver 6 where it is suitably amplified and impressed on the intensity grid 16 to produce, for example, indication $a$. Consequently, from the relative position of indication $a$ with respect to the transmitted pulse $t$ it becomes obvious that the range of the object producing the reflection is greater than 12,000 yards since a fraction more than a complete cycle of the sweep has been completed before the reflected energy is received.

When it is desired to ascertain the exact range of the object producing the indication $a$ the phase of the input voltage to the sweep circuit 12 is decreased by rotating dial 19 in the proper direction to initiate the horizontal sweep of the electron beam of the oscillograph 13 subsequent to the tranmission of an energy pulse and thereby cause all time indications on the sweep to move back with respect to their original positions. The time phase is varied in the foregoing manner until indication $a$ coincides with reference line 44 at point $a'$. At this point the object range may be read directly from dial 19 since there exists a definite and known relation between the electrical degrees of phase shift and range.

It therefore becomes apparent that dial 19 can contain a plurality of range scales, each of which embrace upper and lower range limits of the sweep cycle to which it relates, i.e. 0–12,000 yards, 12,000–24,000 yards and so on. Dial 19 can be located at some remote point, such as, for instance, adjacent the guns.

In addition to the expanded sweep feature, the present invention also functions to reduce the non-linearity effect of phase shifting networks provided by the prior art by operating the pulse transmitter at a sub-frequency of the sweep circuit. For example in the particular case assumed herein, five complete cycles of sweep are completed between transmitted pulses. Thus a one percent error in the phase control device 11 would result in a one-fifth of one percent error in the final range reading.

With reference again to Fig. 1, a level selector 8 is disclosed connected in parallel with a saw-tooth generator 7 and the vertical deflecting plate $V_1$ of the oscillograph 13. A device constructed in accordance with the principles disclosed in the patent to Eric L. C. White, No. 2,113,011, issued April 5, 1938, may be employed to perform the functions of the level selector 8. Shaft 21 in turning adjusts the position of the tap at $R_1$ of White, the signal from sawtooth generator 7 being applied as input pulses to $V_1$ grid of White, the pulse output at $V_6$ anode of White being the pulse signal applied to pulse receiver 6 and mixed with the sawtooth signal from sawtooth generator 7 for application to $V_1$ of oscillograph 13. In order that the present invention may be more easily comprehended, a broad aspect of this device will ensure. Briefly, the device operates in response to a changing potential, such as, for instance, a sawtooth voltage, to produce a controllable phase and time length pulse similar to that shown in the oscillogram A. The time occurrence of this pluse is regulated by the setting of shaft 21 which in turn is controlled by motor 9, shaft 22 and gear box 10. Obviously an energy pulse of this nature applied to the deflecting plate $V_1$ of oscillograph 13 will deflect the electron beam sweep at a time corresponding to the time occurrence of the pulse, which can be varied in phase along the sweep of the oscillograph. A typical example of beam deflection caused by the output of the level selector 8 is shown in Fig. 3 as extending over the time sweep from points $e$–$f$. In addition to deflecting the electron beam the output of the level selector 8 is also fed to the receiver 6 which is of any conventional design and so connected as to contain a normally blocked amplifying channel, which is maintained in this condition by any means well known to the art, such as, for example, zero voltage on the screen grid of a video amplifier. Thus as level selector 8 pulses, receiver 6 is rendered responsive to reception of energy reflected from remote objects being impinged upon by the transmitted pulse. The received energy is suitably amplified and fed to the intensity grid 16 of oscillograph 13 to produce a range indication of the remote object from which the energy is reflected, such as, for instance, indication $b$ as shown in Fig. 3.

There is also shown in Fig. 1 a conventional direct current motor 9 which contains a pair of field windings so connected as to rotate shaft 22 and consequently shafts 20 and 21 in either a clockwise or a counter clockwise direction, depending on which winding is receiving the driving current. There is also shown in this figure a manual motor control device 14 which is inserted into the circuit by way of switch 41 and so designed as to control the direction of rotation of shaft 22. Therefore the speed of motor 9 can be regulated to sweep the level selector pulse spirally down the sweep several times a second and thereby permit continuous reception by receiver 6 in order to provide a continuous indication of the entire range of the apparatus.

As previously mentioned, it is an object of this invention to center range indications on reference line 44 in order to provide point from which object ranges may be measured as a function of time phase. Therefore, as phase control device 11 is varied in the proper direction by shaft 20 in order to move indication $b$ to $b'$ the level selector pulse which extends from points $e$ to $f$ would normally move a corresponding distance on the time sweep to say $e'$, $f'$. As will be brought out more fully hereinafter, it is also an object of this invention to center the range indication on the mid-point of the level selector pulse in such a manner as to maintain both the reflected energy indication and the level selector pulse centered on the reference line 44. It therefore becomes obvious that the level selector 8 and the phase control device 11 must be varied in opposite time phase at an equal rate in order to satisfy the foregoing condition. Therefore, gear box 10 must provide the necessary gear arrangement and ratio for rotating shafts 20 and 21 in opposite directions and at the proper velocities.

It is also contemplated by the present invention to provide a means for automatically centering energy reflection on the reference line 44 which includes direct current motor 9, motor control circuit 15 and coincidence metering circuit 17. The coincidence metering circuit 17, illustrated in Figure 4 of the drawings, is constructed in a manner similar to the coincidence metering circuit disclosed in an application of Robert M. Page, Serial No. 466,291, filed November 20, 1942, for Automatic Range and Bearing Follow-up Systems. As shown, the coincidence metering circuit 17 includes a pair of input channels, namely, the level selector 8 channel and receiver 6 channel, which functions to produce identical wave forms, of opposite phase, regardless of the shape of the input waves applied thereto. The level selector 8 channel includes vacuum tube 50 having an input control grid energized from the output of the level selector 8. Resistance 51 and condenser 52 are included in the output circuit of the tube 50 to provide a predetermined time delay, the purpose of which will appear more fully hereinafter. The output of the tube 50 is applied to the input of a multi-vibrator circuit including vacuum tubes 53 and 54. The input and output of tubes 53 and 54 are cross-connected in conventional manner, through suitable condensers, to form a two-stage capacity coupled amplifier with regenerative feed back. The channel responsive to the output of the receiver 6 includes a multi-vibrator circuit having triode vacuum tubes 55 and 56 inter-connected in a manner similar to 53 and 54. The output of the receiver 6 is applied to the input of the tube 55 through condenser 57 and resistor 58. The plates of tubes 53, 54, 55 and 56 are supplied with equal potential from point 59 through plate resistors 60. The output of the multi-vibrator circuits are applied to the control grid of tubes 61 and 62, respectively. The output of the tubes 61 and 62 are connected to the output lead 18 of the coincidence metering circuit 17. In operation, the output of the level selector 8 operates the tube 50 to initiate charge on the condenser 52. The charging rate of the condenser 52 is determined by the values of the condenser 52 and the resistor 51. Such charging rate is predetermined so that the multi-vibrator circuit comprising tubes 53 and 54 is triggered to produce an output pulse which at all times initiates at the mid-point of the level selector pulse. The condenser 57 and the resistor 58 along with the other circuit parameters determining the response time of the multi-vibrator connected to the receiver 6, produces a sufficient time delay so that the receiver channel multi-vibrator produces a pulse which at all times initiates at the mid-point of the energy pulse from the receiver 6. In view of the foregoing, and due to the construction and inter-connection of the multi-vibrator circuit, each multi-vibrator circuit produces a pulse that is applied to the input of the parallel connected tubes 61 and 62, respectively, that initiates at the mid-point of the pulse from the level-selector 8 and at the mid-point of the signal received from the receiver 6, respectively. Such multi-vibrator output pulses are of opposite phase and therefore, when the pulses initiate in the same time relation, no signal will appear at the output terminal 18. However, when the multi-vibrator output pulses are not produced at the same instant, a certain energy output will appear at terminal 18, of a certain polarity, determined by the time phase relationship between the output pulses of the multi-vibrator circuits. Thus as the level selector 8 pulses to feed its channel of the coincidence metering circiut 17, receiver 6 is simultaneously unblocked to feed its channel of the circuit with a reflected energy pulse which may be, for instance, similar to oscillogram B. The level selector channel operates to initiate its common wave form of one phase at the mid-point of the level selector pulse, and the receiver channel operates to initiate the common wave form output therefrom at the mid-point of the received energy signal. The two input pulses are now common in shape and opposite in phase are balanced against each other. Consequently if the reflected energy pulse and the level selector pulse are not centered in time phase an impulse output similar to that shown in oscillogram C or C' will result from the metering circuit 17 at lead 18. If, however, the reflected energy pulse and the level selector pulse are both centered in time the common waves will balance each other out, and no output will result from the metering circiut 17.

Figure 2:
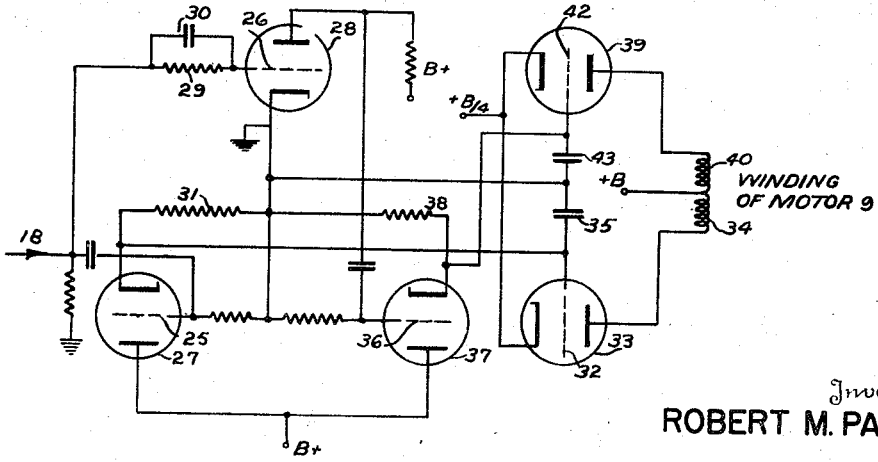
Fig. 2 is a wiring diagram of the motor control circuit 15 shown in Fig. 1.

The output of the metering circuit 17 is applied through line 18 to the motor control circuit 15 which is shown in greater detail in Fig. 2. The output of this circuit is connected by way of switch 41 to the field windings of motor 9. Thus if the reflected energy pulse precedes the mid-point of the level selector pulse a positive pulse, for example, will result from the metering circuit, which is applied to the grids 25 and 26 of triodes 27 and 28, respectively. Triode 28 is so biased as to normally draw a heavy current so the positive pulse input does not substantially affect its plate current. Triode 27, however, is normally blocked and therefore draws little plate current until triggered by the output of the metering circuit to produce a voltage drop across resistor 31. This voltage is applied to grid 32 of the normally blocked triode 33 to cause a plate current to flow through motor winding 34 and thereby rotate shaft 22 in one direction. The time constant of the circuit comprising resistor 31 and capacitor 35 is so adjusted that the bias of tube 33 and consequently the current flow through winding 34 will be maintained at a relatively steady value, to cause uniform motion of the shaft 22. Now if the reflected energy pulse follows the mid-point of the level selector pulse a negative pulse, for example, will be applied to the grids 25 and 26 of triodes 27 and 28 respectively. This negative pulse will drop the plate current flow through triode 28 and therefore cause its anode voltage to rise in a positive direction. This rise in voltage is applied to the grid 36 to unblock triode 37 and thereby cause a heavy plate current to flow through this tube to produce a voltage drop across resistor 38. This voltage is applied to grid 42 of triode 39 to cause this tube to draw a plate current through motor winding 40 and thereby rotate shaft 22 in the other direction. The time constant of the circuit comprising resistor 38 and capacitor 43 is so adjusted that the bias of tube 39 and consequently the current flow through winding 40 will be maintained at a relatively steady value and thereby cause uniform motion of the shaft 22.

Thus the output from metering circuit 17 operates control circuit 15 which in turn controls motor 9 and the rotation of shaft 22 in the proper direction to maintain receiver pulse B centered on the mid-point of level selector pulse A and both pulses centered on reference line 44 by way of shafts 20 and 21 in a manner heretofore discussed. Consequently the changing range of a remote moving object will be automatically followed by the present device and read directly from dial 19 which may be, as previously mentioned, located at any desired remote place.

It should be understood that the practice of the invention is not limited to the embodiments illustrated and described but is circumscribed only by the scope and limitations of the appended claims.

The invention described herein may be manufactured and used by or for the Government of the United States of America for governmental purposes without the payment of any royalties thereon or therefor.

I claim:

1. The method of determining range of a remote object which comprises periodically transmitting energy pulses toward a remote object, said energy pulses being of a duration less than the repetition period of said pulses, receiving reflected energy for an interval of substantially the same order of duration as said transmitted energy in accordance with a timing wave of the same frequency as the repetition rate of said transmitted energy, varying the time phase between said transmitted energy and the foregoing interval so as to continually receive energy reflected from a selected object, and indicating the range of said selected object from a second timing wave having a frequency greater than the frequency of said first timing wave.

2. The method of determining range of a remote object which comprises periodically transmitting energy pulses toward a remote object, said energy pulses being of a duration less than the repetition period of said pulses, receiving reflected energy for an interval of substantially the same order of duration as said transmitted energy in accordance with a first timing wave of the same frequency as the repetition rate of said transmitted energy, varying the time phase between said transmitted energy and the foregoing interval so as to continually receive energy reflected from a selected object, and indicating the range of said selected object from a second timing wave having a frequency which is an integral multiple of that of said first timing wave.

3. In a radio echo detection system comprising a cathode ray tube indicator, the method of determining range of a remote object which comprises periodically transmitting energy pulses toward the remote object, said energy pulses having a duration less than the repetition period of said pulses, receiving reflected energy for an interval of substantially the same order of duration as said energy pulses in accordance with a timing wave of the same frequency as the repetition rate of said energy pulses, producing on said cathode ray tube indicator a time scale having a frequency equal to an integral multiple of that of said timing wave, indicating on said time scale the reception of energy reflected from a selected object, and shifting in time phase the initiation of said time scale relative to said transmitted energy pulse whereby the indication of the reception of said reflected energy may be maintained at a reference position on said time scale.

4. The method of determining range of a remote object which comprises periodically transmitting energy pulses toward the remote object, said energy pulses having a duration less than the repetition rate of said pulses, receiving reflected energy for an interval of substantially the same order of duration as said energy pulses in accordance with a timing wave of the same frequency as the repetition rate of the transmitted energy pulses, producing a reference signal in accordance with said timing wave that originates at the mid-point of said interval, varying the phase of a second timing wave synchronized with said first timing wave and having a frequency greater than the frequency of said first timing wave in response to a phase difference between said reference signal and reception of pulse energy reflected from said remote object to continually maintain said reference signal and said received pulse energy reflected from said remote object in the same phase, and indicating the range of said remote object as a function of phase of said second timing wave.

5. An apparatus for indicating the range of remote objects comprising, a means for transmitting an intermittent energy wave, a means for generating a substantially square wave energy pulse in synchronism with said energy wave, a means for receiving energy reflected from remote objects being impinged upon by said energy wave over the period of said square wave, a means for converting said square wave into a standard wave of one phase, a means for initiating said standard wave at the mid-point of said square wave, a means for converting said reflected energy into a second standard wave opposite in phase and in response to said reflected energy, a means for balancing said standard waves against each other, a means for varying the time phase of said square wave in response to the resultant energy and phase of said standard waves to synchronize said standard waves, an oscillograph, and a means for applying said square wave and said reflected energy thereon to produce time indications thereof.

6. An apparatus for indicating range of remote objects comprising, a means for transmitting an intermittent energy wave, means generating a substantially square energy pulse in synchronism with said intermittent energy wave, a means receiving energy reflected from remote objects impinged upon by said energy wave over the period of said square wave pulse, a means operating in response to the phase difference between the mid-point of said square wave and said reflected energy to vary the time phase of said square wave and thereby to center in time said reflected energy and said square wave pulse, an oscillograph, and a means producing time indications of said square wave and said reflected energy on said oscillograph.

7. An apparatus for indicating range of remote objects, comprising, a pulse transmitter, said pulse transmitter transmitting a series of equally spaced energy pulses, means generating a substantially square energy pulse in synchronism with said transmitted series, a means receiving energy reflected from remote objects impinged upon by said energy pulses over the period of said square wave, a means operating in response to the phase difference between the mid-point of said square wave and said reflected energy to vary the time phase of said square wave and thereby to center in time said reflected energy on said square wave, an oscillograph, and means producing time indications of said square wave and said reflected pulse on said oscillograph.

8. An apparatus for indicating range of remote objects, comprising, a pulse transmitter, said transmitter emitting a series of equally spaced energy pulses, means generating a substantially square wave energy pulse in synchronism with said transmitted series, a receiver, means rendering said receiver responsive for the duration of said square wave pulse to energy pulses reflected from remote objects being impinged upon by said transmitted series, a means operating in response to the phase difference between the mid-point of said square wave and said reflected energy to vary the time phase of said square wave and thereby to center in time said reflected energy on said square wave, an oscillograph, and means applying said square wave and said reflected energy thereon to produce time indications thereof.

9. An apparatus for indicating range of remote objects, comprising a pulse transmitter, said transmitter emitting a series of equally spaced energy pulses, means generating a substantially square wave energy pulse in synchronism with said transmitted series, a receiver, means applying said square wave pulse to said receiver to render said receiver responsive for the duration of said pulse to energy reflected from remote objects, an oscillograph, means producing a timing wave having a frequency a number of times greater than said transmitted series, means producing a sweep of the electron beam of said oscillograph in accordance with said timing wave, means operating in response to the difference in phase between the mid-point of said square wave pulse and said reflected energy to vary the time phase of said timing wave and said square wave pulse to center in time said square wave and said reflected energy, and means applying said square wave and said reflected energy on said oscillograph to produce time indications thereof.

10. An apparatus for indicating range of remote objects comprising, a means for transmitting an intermittent energy wave, means generating a substantially square wave in synchronism with said intermittent energy wave, a means receiving energy reflected from remote objects impinged upon by said energy wave over the period of said square wave, a means operating in response to the phase difference between the mid-points of said square wave and said reflected energy to vary the time phase of said square wave and thereby to center in time said reflected energy on said square wave, an oscillograph, a means for producing a timing wave, a means for producing a sweep of the electron beam of the oscillograph in accordance with said timing wave, a means for applying said square wave and said reflected energy on said oscillograph to produce time indications thereof, and means operating in synchronism with said first phase shifting means for varying the time phase of said timing wave to center said time indications on a reference line on said oscillograph from which the range of the object from which the energy is reflected is represented as a function of said time phase of said timing wave.

11. An apparatus for indicating range of remote objects comprising, a means for producing an intermittent wave, means generating a substantially square wave in synchronism with said intermittent energy wave, a means receiving energy reflected from remote objects over the period of said square wave, a means operating in response to the phase difference between the mid-points of said square wave and said reflected energy to vary the time phase of said square wave and thereby to center in time said reflected energy on said square wave, an oscillograph, a means for producing a timing wave, a means for producing a sweep of the electron beam of the oscillograph in accordance with said timing wave, a means for applying said square wave and said reflected energy on said oscillograph to produce time indications thereof, and a means operating in synchronism with said first phase shifting means for varying the time phase of said timing wave to center said time indications on a reference line on said oscillograph from which the range of the object from which the energy is reflected is represented as a function of said time phase of said timing wave having a frequency a number of times greater than said intermittent energy wave.

12. An apparatus for continually determining range of a remote object comprising means intermittently transmitting energy toward the remote object, a receiver, means intermittently unblocking said receiver for a short time interval with respect to the time interval between transmitted energy, means for producing a first timing wave having a frequency equal to the repetition rate of said transmitted energy to control said unblocking means, means for producing a second timing wave synchronized with said first timing wave and having a frequency greater than the frequency of said first timing wave, a cathode ray tube indicator, means operative in response to said second timing wave for producing a time sweep of the electron beam of said cathode ray tube and means connecting the output of said receiver to said cathode ray tube whereby only the energy received during the unblocked period of the receiver will be recorded on the cathode ray tube indicator.

13. An apparatus for continually determining range of a remote object comprising means intermittently transmitting energy toward the remote object, a receiver, means for producing a first timing wave having a frequency equal to the repetition rate of said transmitted energy, means intermittently unblocking said receiver in accordance with said first timing wave, means for producing a second timing wave synchronized with said first timing wave and having a frequency greater than the frequency of said first timing wave, a cathode ray tube indicator, means operative in response to said second timing wave for producing a time sweep on the viewing screen of said cathode ray tube, means operative to record on said indicator the interval during which said receiver is unblocked and any energy signal received during such interval, and means for concurrently shifting in an opposite sense, the time phase of the second timing wave and the interval during which said receiver is unblocked.

14. An apparatus for continually determining range of a remote object comprising, transmitting means periodically emitting energy pulses toward a remote object, a receiver, a cathode ray tube indicator connected to the output of said receiver, means generating a timing wave having a frequency equal to an integral multiple of the repetition frequency of said transmitting means, sweep generating means including a phase control device operative responsive to said timing wave to produce a time trace on the viewing screen of said cathode ray tube, said phase control device being operative to selectively change the phase relation between the initiation of said time trace and the emission of an energy pulse from said transmitting means, means for momentarily unblocking said receiver at a selectable time following the transmission of each energy pulse, and means indicating on said cathode ray tube the period during which said receiver is unblocked.

15. The method of determining the distance to a remote object which comprises generating a high frequency wave, generating two pulses each at fixed known time positions in the cycle of said wave and spaced apart in time by a variable number of cycles of said wave, transmitting the first of said pulses, and receiving the echo thereof from said object and determining said distance by varying said number of cycles until said second pulse agrees in time with said received echo.

16. In combination, means to transmit periodic pulses and to receive said pulses both directly and as echoes from remote objects, means to produce a high frequency wave, means to synchronize said pulses by said wave, a pulse indicator, means to operate said pulse indicator to indicate said received pulses over a fixed interval short relative to the interval between said pulse received directly and said echo, means to vary said interval in relation to said wave from a time position in said wave such that said pulse received directly is indicated by said indicator to a time position such that the echo of said pulse is indicated by said indicator, means to operate in accord with the range from which said echo is received, and means to operate said last means in accord with the number of cycles of said wave between said time positions.

17. Electric delay measuring apparatus comprising a generator of a continuous constant frequency alternating wave, means under control of said wave for producing a first series of pulses having a period which is an integral multiple of the period of said wave, means for producing under control of the pulses of said first series of a second series of pulses having a period equal to that of said first series but which are delayed with respect to corresponding pulses of said first series by intervals which may vary, means under control of said wave for producing a third series of pulses having a period equal to that of said first and second series of pulses, means for shifting the phase of the pulses of said third series with respect to the pulses of said first series for bringing the pulses of said third series into coincidence with corresponding pulses of said second series, thereby making the delay of the pulses of said third series with respect to corresponding pulses of said first series equal to the delay of pulses of said second series with respect to corresponding pulses of said first series, and means for indicating said delay.

18. In a pulse echo system in which recurrent pulses are transmitted and after each of such pulses one or more corresponding pulses are received at times dependent on the range from which the respective pulse arrives, a viewing screen, means to indicate said received pulses on said screen in space sequence corresponding to the time sequence in which they are received, separate range indicating means, means to select pulses producing one of said indications on said screen to the exclusion of other pulses producing indications on said screen, and means for controlling said separate range indicating means responsively to the last-named means to indicate range of the selected pulses.

19. In a system of the character described, means for producing ultra high frequency energy in pulses, a radiator for emitting such pulses, a receiver responsive to energy reflected from a distant object, means for generating waves of pulse rate frequency, phase shifting means connected to said means for generating waves of pulse rate frequency for delaying said waves for a time equal to the interval between the emission of a pulse and the reception of energy reflected from the object due to the pulse, means connected to said phase shifting means for forming said phase shifted waves into distant reference pulses, and indicator means for revealing the time relationship between the received and phase shifted pulses.

References Cited in the file of this patent

UNITED STATES PATENTS

| | | |
|---|---|---|
| 1,924,174 | Wolf | Aug. 29, 1933 |
| 2,178,074 | Jackel | Oct. 31, 1939 |
| 2,208,422 | Hugon | July 16, 1940 |
| 2,405,239 | Seeley | Aug. 6, 1946 |
| 2,416,088 | Deerhake | Feb. 18, 1947 |
| 2,421,020 | Earp | May 27, 1947 |